T. DAVIS.
FOLDING CAR STEP.
APPLICATION FILED MAY 14, 1920. RENEWED AUG. 15, 1921.
1,392,821.
Patented Oct. 4, 1921.
2 SHEETS—SHEET 1.
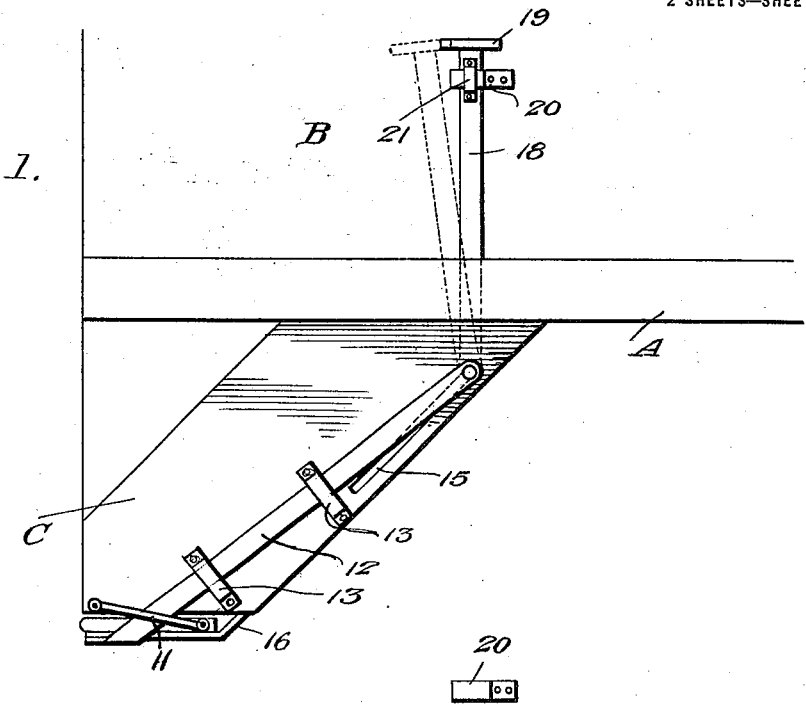
Fig. 1.
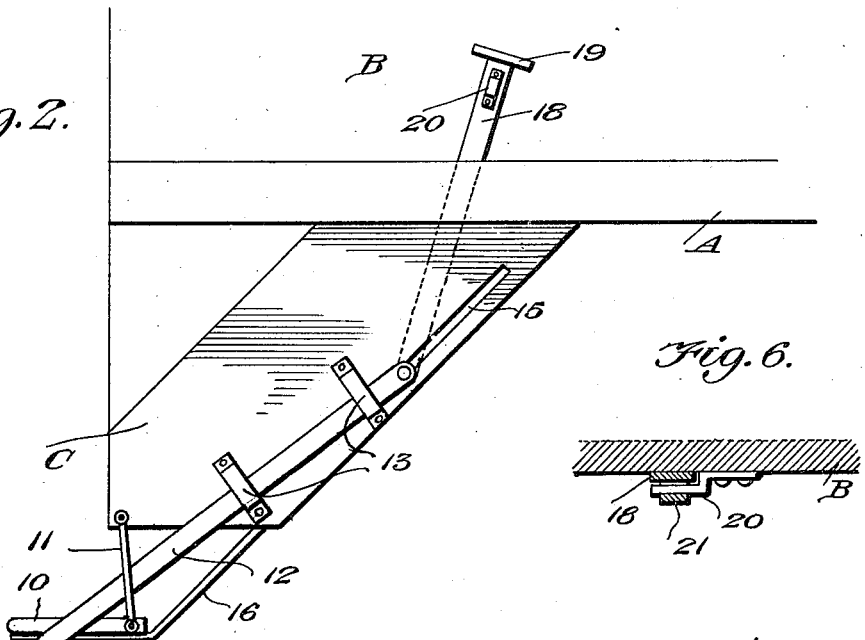
Fig. 2.
Fig. 6.
Tommie Davis
INVENTOR
BY Victor J. Evans
ATTORNEY
WITNESS:

T. DAVIS.
FOLDING CAR STEP.
APPLICATION FILED MAY 14, 1920. RENEWED AUG. 15, 1921.
1,392,821. Patented Oct. 4, 1921.
2 SHEETS—SHEET 2.
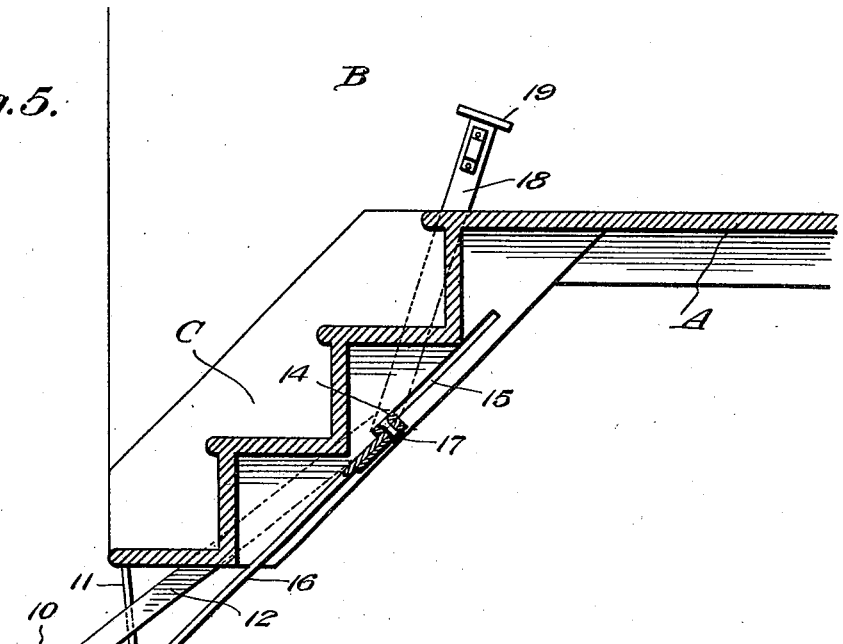
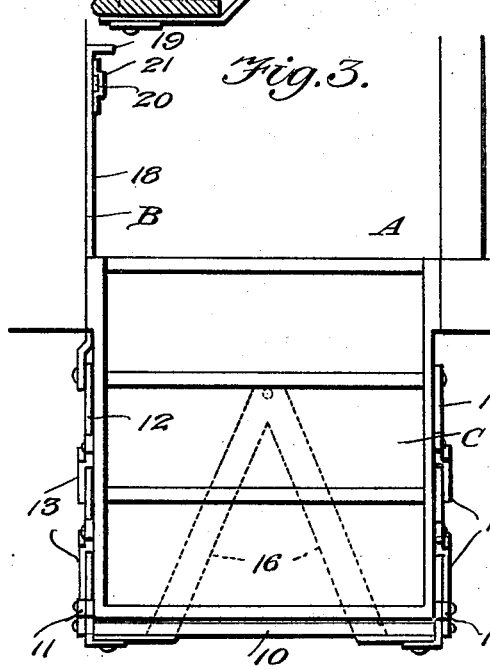
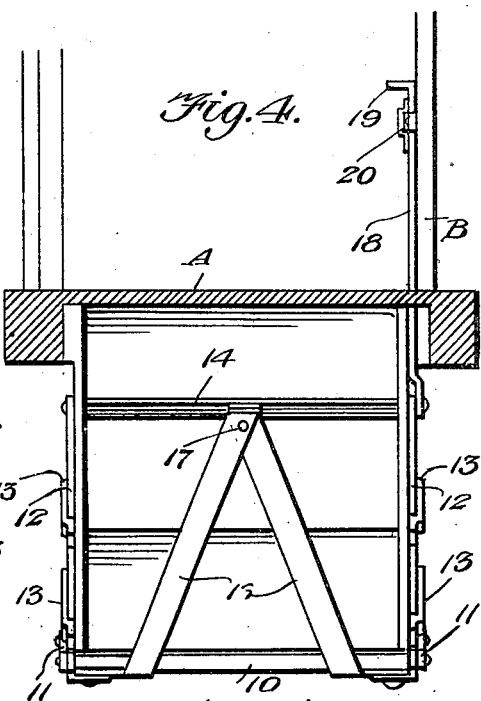
Tommie Davis INVENTOR
BY Victor J. Evans ATTORNEY

UNITED STATES PATENT OFFICE.

TOMMIE DAVIS, OF FORT LYON, COLORADO.

FOLDING CAR-STEP.

1,392,821.  Specification of Letters Patent.  Patented Oct. 4, 1921.

Application filed May 14, 1920, Serial No. 381,449. Renewed August 15, 1921. Serial No. 492,586.

*To all whom it may concern:*

Be it known that I, TOMMIE DAVIS, a citizen of the United States, residing at Las Animas, Fort Lyon, in the county of Bent and State of Colorado, have invented new and useful Improvements in a Folding Car-Step, of which the following is a specification.

This invention relates to railroad cars and the like for passenger service, and has for its object the provision of an extension step associated with the ordinary car steps and adapted to be projected to extend therebelow as an auxiliary step to take the place of the box-like stools commonly set in position by the porters of trains when the passengers alight.

An important object is the provision of an extension step of this character which is normally held in folded position beneath the lowermost one of the ordinary steps and which is provided with means whereby it may be quickly and easily extended into operative position.

An additional object is the provision of a step of this character which will be simple and inexpensive in manufacture and installation, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a view showing my step in association with the ordinary car steps and in folded position, Fig. 2 is a similar view showing the auxiliary step in extended position, Fig. 3 is a front elevation, Fig. 4 is a rear elevation, Fig. 5 is a longitudinal sectional view, and Fig. 6 is a detail horizontal sectional view through the operating lever at the retaining catch.

Referring more particularly to the drawings, the letter A designates a portion of a car platform, B designates a portion of the vestibule walls, and C designates the ordinary stationary steps.

In carrying out my invention I provide an auxiliary step 10 which is disposed at the lower end of the stationary steps and which is supported in position for swinging movement by pivoted hangers 11. Secured to the step 10 are side bars 12 formed of metal which are disposed within brackets 13 in the sides of the stationary steps at the outer faces thereof and the lower ends of these bars 12 are bent to extend below and are secured to the underside of the step 10. The upper ends of these bars 12 are connected by a cross bar 14 which extends through elongated slots 15 formed in the sides of the stationary steps. Diagonal brace bars 16 are secured at their upper ends centrally upon the cross bar 14, as shown at 17, and have their lower ends disposed below and secured to the underside of the step 10.

In order that the position of the auxiliary step 10 may be controlled, I provide a lever 18 which is disposed between the vestibule wall B and the adjacent side of the stationary steps and this lever is pivotally connected at its lower end with the adjacent end of the cross bar 14. The upper end of the lever 18 is provided with a handle 19. Secured upon the vestibule wall B is a latch 20 which is engageable within a bracket 21 carried by the lever 18 whereby to hold the lever against movement.

Referring to Fig. 1 it will be seen that when use of the auxiliary step 10 is not desired, the lever 18 is in its uppermost position with the latch 20 engaging within the bracket 21. The lever 18 cannot move and therefore the bars 12 are held stationary and the step 10 is supported in folded position immediately against the underside of the lowermost stationary step.

When the use of the step 10 is desired, it is first necessary to press forwardly upon the lever 18 to disengage the latch 20 from the bracket 21 and then swing the lever 18 rearwardly as far as possible. When the operator then presses down upon the lever the lever will force the cross bar 14 downwardly along the slots 15 and this will cause the bars 12 to be projected beyond the ends of the sides of the stationary steps which will cause the step 10 to swing downwardly. After the step is in this extended position, it will be readily apparent that it will facilitate the alighting from or stepping onto trains without the dangers attendant upon the use of the little foot stool commonly employed.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

An extension car step comprising an auxiliary step pivotally connected by hangers at the lower end of stationary steps and movable to extend therebelow or to lie flat against the underside of the lowermost step, brackets secured upon the sides of the stationary steps, a longitudinally movable bar slidable through said brackets and rigidly connected with the auxiliary step, the sides of the stationary steps being formed with elongated slots, a cross bar connecting said longitudinally slidable bars and slidable through said slots, a lever connected with one end of said cross bar, a U-shaped bracket carried by said lever, and a stationary bracket secured above the stationary steps and having an offset end adapted to be engaged within said U-shaped bracket whereby to hold said lever against movement.

In testimony whereof I affix my signature.

TOMMIE DAVIS.